United States Patent
Heitkamp et al.

(10) Patent No.: US 6,675,307 B1
(45) Date of Patent: Jan. 6, 2004

(54) CLOCK CONTROLLER FOR CONTROLLING THE SWITCHING TO REDUNDANT CLOCK SIGNAL WITHOUT PRODUCING GLITCHES BY DELAYING THE REDUNDANT CLOCK SIGNAL TO MATCH A PHASE OF PRIMARY CLOCK SIGNAL

(75) Inventors: Ross S. Heitkamp, Mountain View, CA (US); Chang-Hong Wu, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/536,886

(22) Filed: Mar. 28, 2000

(51) Int. Cl.$^7$ .................................................. G06F 1/12
(52) U.S. Cl. ........................ 713/401; 713/503; 327/149
(58) Field of Search .................. 713/400, 401, 713/500, 502, 503; 323/212; 331/2; 375/376; 714/1, 744; 327/141, 144, 147, 149

(56) References Cited

U.S. PATENT DOCUMENTS

| | | | | |
|---|---|---|---|---|
| 4,672,299 A | * | 6/1987 | Grimes et al. | 323/217 |
| 5,101,117 A | * | 3/1992 | Johnson et al. | 327/149 |
| 5,596,614 A | * | 1/1997 | Ledda | 375/376 |
| 5,964,880 A | * | 10/1999 | Liu et al. | 713/401 |
| 6,055,362 A | * | 4/2000 | Kesner et al. | 714/1 |
| 6,104,225 A | * | 8/2000 | Taguchi et al. | 327/298 |
| 6,194,969 B1 | * | 2/2001 | Doblar | 331/2 |

FOREIGN PATENT DOCUMENTS

JP        09223945 A   *   8/1997   .......... H03H/11/20

OTHER PUBLICATIONS

Ishibashi et al.—"A Novel Clock Distribution System for CMOS VLSI"—Computer Design: VLSI in Computers and Processors, 1993. ICCD '93. Proceedings., 1993 IEEE International Conference on , Oct. 3–6, 1993. page(s): 289–292.*

* cited by examiner

Primary Examiner—Thomas Lee
Assistant Examiner—Thuan Du
(74) Attorney, Agent, or Firm—Harrity & Snyder, LLP

(57) ABSTRACT

A system and method for controlling clocking signals including a clock controller that includes a first input operable to receive a first clock signal having a first frequency, a second input operable to receive a second clock having a same frequency as the first clock signal but of arbitrary phase, a first output and a variable delay line coupling the first clock signal received at the first input to the first output. The first output is operable to couple a delayed version of the first clock signal to the receiving device. The clock controller includes a comparator receiving as an input the first and the second clock signals from the first and second inputs and providing as an output to the variable delay line a control signal for adjusting a delay in the first clock signal so as to match a phase of the second clock signal received at the receiving device.

29 Claims, 4 Drawing Sheets

CLOCK CONTROLLER FOR CONTROLLING THE SWITCHING TO REDUNDANT CLOCK SIGNAL WITHOUT PRODUCING GLITCHES BY DELAYING THE REDUNDANT CLOCK SIGNAL TO MATCH A PHASE OF PRIMARY CLOCK SIGNAL

The invention relates generally to electrical circuits, and more particularly to synchronization and timing circuits.

BACKGROUND

A clock source can be used to synchronize communications among plural electrical circuit elements. For example, a clock source can be used in conjunction with a communications bus to provide a synchronous communications link between a sourcing and a receiving device. A source synchronous communications bus can be used to couple a source device to one or more receiving devices. In a source synchronous communications link, the source device provides a sourcing clock signal that can be used by a receiving device to synchronize the reading of data from the communications link.

Electrical designs for mission critical systems must provide reliability. Redundancy can be built into a mission critical system to provide a measure of reliability. For example, a system designer may provide a design that includes a master system that is supported by a fully redundant slave system. In the event a failure arises in the master system, the slave system can be utilized to support system requirements. However, the transition from the master system to the slave system can cause problems. Depending on the system design requirements, the slave system may be required to take over immediately so that no down time is experienced. Alternatively, the master system may need to be taken off line prior to the starting of the slave system. Information may be required to be shared between the master and slave system in order to support the transition. Timing and control issues and glitches are some of the problems that must be resolved when introducing redundancy to a system.

SUMMARY

In one aspect, the invention provides a redundant clock controller that includes a first input operable to receive a first clock signal having a first frequency, a first output operable to couple the first clock signal to a receiving device, a second input operable to receive a second clock having a same frequency as the first clock signal but of arbitrary phase, a second output and a variable delay line coupling the second clock signal to the second output.

The second output is operable to couple a delayed version of the second clock signal to the receiving device. The redundant clock controller includes a comparator receiving as an input the first and the second clock signals and providing as an output to the variable delay line a control signal for adjusting a delay in the second clock signal so as to match a phase of the first clock signal received at the receiving device.

Aspects of the invention can include one or more of the following features. The variable delay line can include a delay that can be adjusted to be greater than a period of the first clock signal. The first clock frequency can be set to approximately 19.44 MHz and the delay can be adjusted up to 70 nanoseconds.

The redundant clock controller can include a first output circuit coupling the first clock signal to the first output, and a second output circuit coupling the delayed version of the second clock signal to the second output, wherein each of the output circuits includes means for disabling the transmission of a respective clock signal to the receiving device. The output circuit can include a divider circuit for producing a lower frequency clock signal from a respective clock signal. The first clock frequency signal can be approximately 19.44 MHz and the lower clock frequency signal can be approximately 8 kHz. The divider can include a down counter operable to receive a clock signal of a high frequency and output a signal of a lower frequency, wherein the lower frequency level is determined by a count value that is loaded into the down counter after each reset.

The redundant clock controller can include a coarse alignment circuit operable to monitor the phase difference between the two low frequency clock signals generated by the respective output circuits wherein the count value is varied depending on the phase difference between the two low frequency clock signals. The count value can be varied between 1213 and 1214 counts.

The redundant clock controller can include a first phase locked loop coupled between the variable delay line and the second output operable to low pass filter glitches introduced by the variable delay line circuit.

The redundant clock controller can include a second variable delay line coupled between the first input and the first output, a second comparator receiving as an input the first and the second clock signals and providing as an output to the second variable delay line a second control signal for adjusting a delay in the first clock signal so as to match a phase of the second clock signal received at the receiving device, a selector for selecting one of either the first or the second clock signals as a master clock signal and a means for disabling the delay imparted from the variable delay line in the signal path for the master clock signal.

The redundant clock controller can include a phase locked loop in line between each variable line delay and a respective output. The phased locked loop can be operable to provide a low pass filter for glitches introduced by a variable delay line to a respective clock signal.

The comparator can include a counter, a phase comparator and a controller. The phase comparator receives as inputs each of the first and second clock signal and provides as an output an indication of a relative phase difference between the two clock signals. The output of the phase comparator is coupled to the input of the counter. The counter is operable to evaluate the indication received from the phase comparator and provide as an output a count that reflects a change in the delay provided by the variable delay line so as to minimize the phase difference between the first and second clock signals. The output of the counter is coupled to the input of controller. The controller is operable to program the variable delayline to set the delay for the second clock signal.

In another aspect the invention provides a method for providing a redundant clock signal to a receiving device and includes providing first and second frequency source signals, each of the first and second frequency source signal being of a same frequency but of arbitrary phase. The method includes comparing the first and second frequency source signals to determine a phase difference between the first and second frequency source signals and selecting one of the first and second frequency source signals as a master clock signal, the other being a slave clock signal. If a phase difference is detected, the method sets a delay in the slave clock signal so as to align the phase of the slave clock signal to the master clock signal. The master clock signal is provided to a receiving device. The method includes switching upon a predetermined event and providing the slave clock signal to the receiving device without introducing glitches in the switchover.

In another aspect the invention provides a clock controller that includes a first input operable to receive a first clock signal having a first frequency, a second input operable to receive a second clock having a same frequency as the first clock signal but of arbitrary phase, a first output and a variable delay line coupling the first clock signal received at the first input to the first output. The first output is operable to couple a delayed version of the first clock signal to the receiving device. The clock controller includes a comparator receiving as an input the first and the second clock signals from the first and second inputs and providing as an output to the variable delay line a control signal for adjusting a delay in the first clock signal so as to match a phase of the second clock signal received at the receiving device.

Aspects of the invention can include one or more of the following advantages. A system is provided for aligning two frequency sources of arbitrary phase to produce a redundant clock controller system that meets the stringent requirements of GR-1244-CORE for the maximum time interval error (MTIE) and mean phase error (TDEV).

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1b is a schematic block diagram of a redundant clock controller of FIG. 1a.

Like reference symbols in the various drawings indicate like elements.

DETAILED DESCRIPTION

Figure 1A:
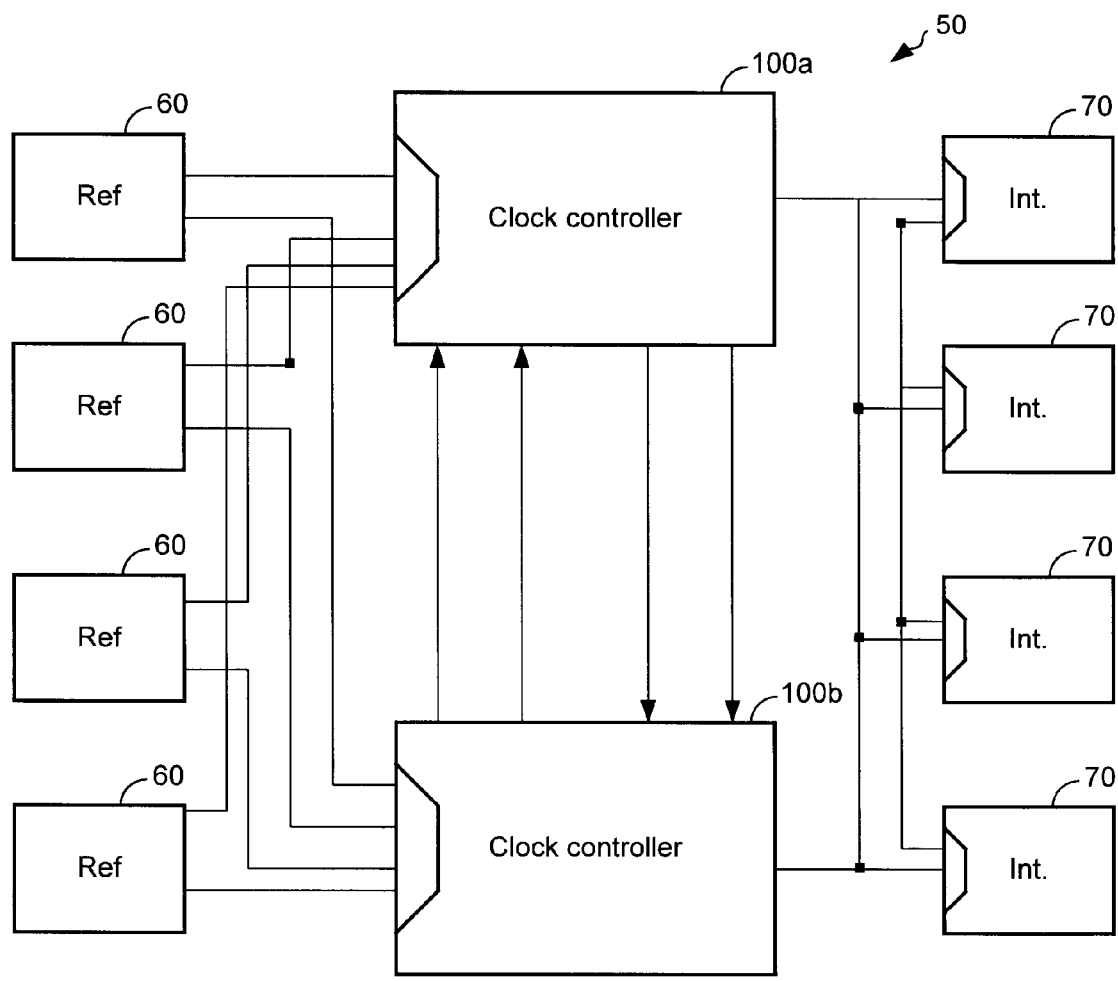
FIG. 1a is a schematic block diagram of a synchronization system for providing redundant timing control for a plurality of interfaces.

A system is provided that includes redundant clock controllers for use in synchronizing signals transmitted between devices. Referring now to FIG. 1a, a synchronization system 50 includes redundant clock controllers 100 that are operable to receive inputs from a plurality of reference sources 60 and provide as an output timing signals to a plurality of interfaces 70. In one implementation, the redundant clock controllers 100 are used as part of a distributed clock controller in a fully redundant, carrier class, core backbone router. Each clock controller provides line timing for the router and accepts reference synchronization sources from a plurality of interfaces. The clock controller provides a phase and frequency filtered timing reference back to the plurality of interfaces for use in synchronizing transmitted signals on those interfaces.

Figure 1B:
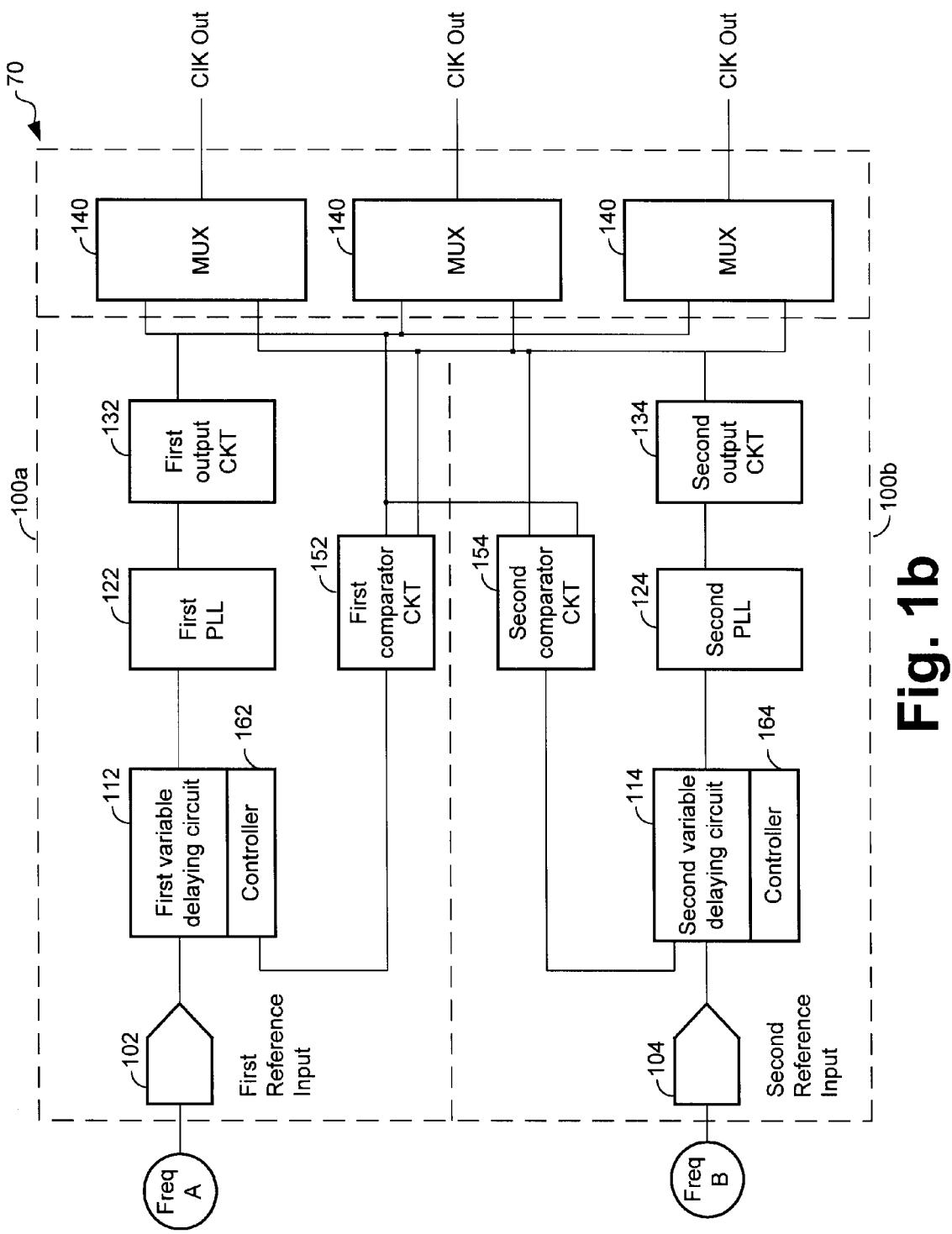

Referring now to FIG. 1b, each of the redundant clock controllers 100a and 100b includes a frequency source input (i.e., first frequency source input 102 and second frequency source input 104), a variable delayline circuit (i.e., first and second variable delayline circuits 112 and 114), a phase-locked loop circuit (i.e., first and second phase-locked loop circuits 122 and 124), an output circuit (i.e., first and second output circuits 132 and 134) and a comparator circuit (i.e., first and second comparator circuits 152 and 154). The redundant clock controllers 100a and 100b provide as an output two in phase clock signals of the same frequency to one or more interfaces (e.g., interfaces 70 of FIG. 1a) that include a receiving device, such as multiplexor 140. In one implementation, plural multiplexors 140 are included to support clock distribution to plural devices.

First frequency source input 102 is coupled to a frequency source (Frequency source A) and provides a first frequency source signal to clock controller 100a. In one implementation, frequency source A is an independently frequency locked source provided by a frequency locked loop. First frequency source input 102 couples the first frequency source signal to an input of the first variable delayline circuit 112. The output of first variable delayline circuit 112 is coupled to the input of first phase-locked loop circuit 122, whose output in turn is coupled to the input of the first output circuit 132. The output of the first output circuit 132 is coupled to a first input of each of the receiving devices (e.g. multiplexor 140) and to a first input of first comparator circuit 152 and second input of second comparator circuit 154.

Second frequency source input 104 is coupled to a second frequency source (Frequency source B) and provides a second frequency source signal to the clock controller 100b. In one implementation, frequency source B is an independently frequency locked source provided by a frequency locked loop. Second frequency source input 104 couples the second frequency source signal to an input of the second variable delayline circuit 114. The output of second variable delayline circuit 114 is coupled to the input of second phase-locked loop circuit 124, whose output in turn is coupled to the input of the second output circuit 132. The output of the second output circuit 132 is coupled to a second input of the each of the receiving devices (e.g. multiplexor 140) and to a second input of first comparator circuit 152 and first input of second comparator circuit 154. The output of the first comparator circuit 152 is coupled to an input of first variable delayline circuit 152. The output of the second comparator circuit 154 is coupled to an input of second variable delayline circuit 154.

Figure 2:
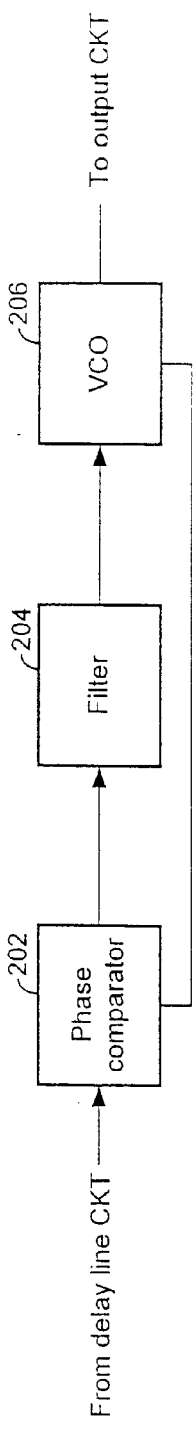
FIG. 2 is a schematic block diagram of a phase locked loop.

Referring now to FIG. 2, each of PLL 122 and 124 include phase comparator 202, a filter 204 and voltage-controlled oscillator (VCO) 206. Each of PLL 122 and 124 provide a low pass filter for phase transients generated by the variable delayline circuit 152 and 154. The input received from a variable delayline circuit is coupled to an input of phase comparator 202. The output of phase comparator 202 is coupled to an input of filter 204 whose output is in turn coupled to the input of VCO 206. One output of VCO 206 is coupled back to a second input of phase comparator 202. The second output from the VCO is coupled to an input of an output circuit (either 132 or 134, respectively).

Figure 3:
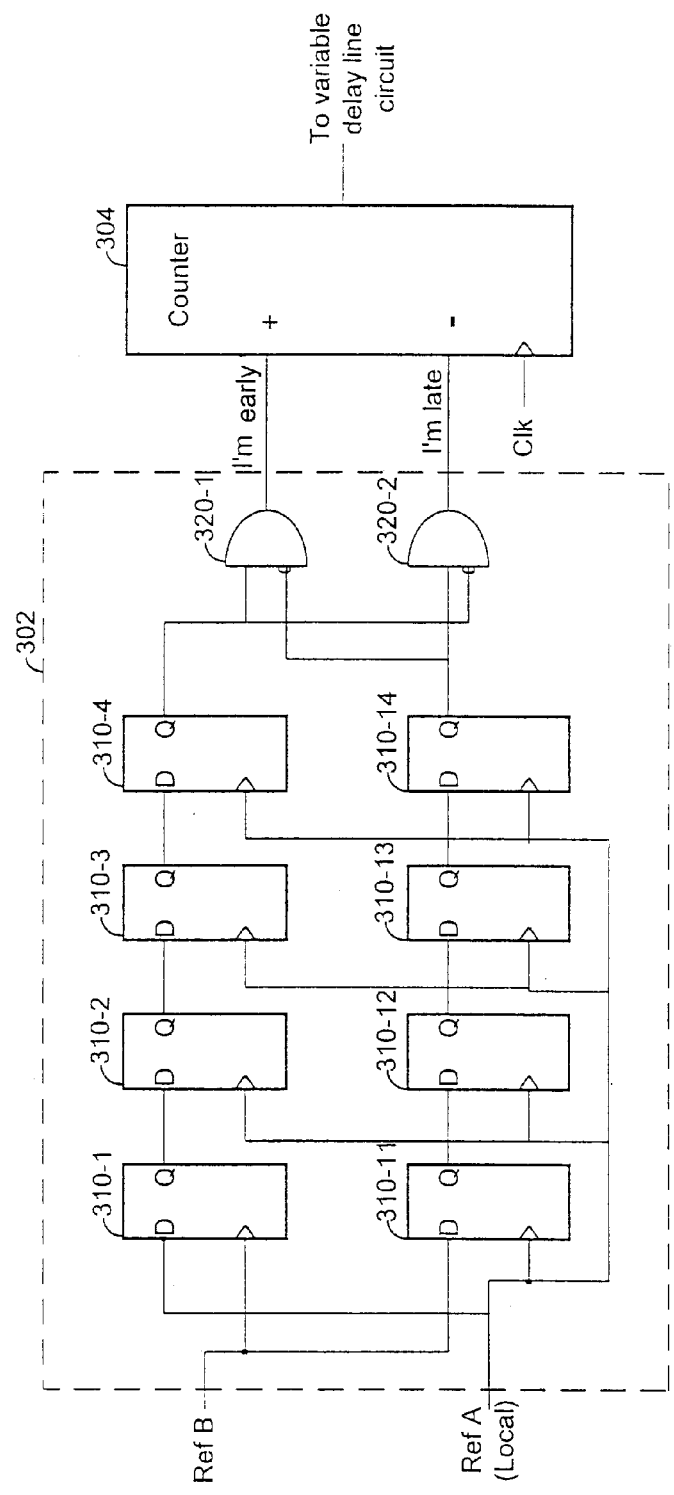
FIG. 3 is a schematic diagram of a comparator circuit.

Referring now to FIG. 3, comparator circuit 152 and 154 includes a phase comparator 302 and counter 304. Phase comparator 302 includes a plurality of D flip-flops 310 and logic gates 320. For a given comparator circuit, the local frequency source signal is provided as an input to a first D flip-flop 310-1 and to the clock input of the first D flip-flop 310-11. The first D flip-flop's 310-1 output is coupled to the input of a second D flip-flop 310-2. The output of the second D flip-flop 310-2 is coupled to the input of a third D flip-flop 310-3 whose output is in turn coupled to the input of a fourth D flip-flop 310-4. The output of the fourth D flip-flop 310-4 is coupled to a non-inverting input of logic gate 320-1 and the inverting input of logic gate 320-2.

The second frequency source signal is provided as an input to a first D flip-flop 310-11 and to the clock input of the first D flip-flop 310-1. The first D flip-flop's 310-11 output is coupled to the input of a second D flip-flop 310-12. The output of the second D flip-flop 310-12 is coupled to the input of a third D flip-flop 310-13 whose output is in turn coupled to the input of a fourth D flip-flop 310-14. The output of the fourth D flip-flop 310-14 is coupled to a non-inverting input of logic gate 320-1 and the inverting input of logic gate 320-2. The clock inputs for each of the second through fourth D flip-flops are coupled to the local frequency source (Frequency source A for comparator 152 or Frequency source B for comparator 154). For comparator 152, the local frequency source input (ref A) is Frequency source A, and the clock input for the D flip-flops is provided by Frequency source A. For comparator 154, the local frequency source input (ref A) is Frequency source B, and the clock input for the D flip-flops is provided by Frequency B source. Those of ordinary skill in the art will recognize that the cascading of D flip-flops provides a metastable solution for the phase comparison operation.

Depending on the state of the local and the second frequency source signal, counter 304 is incremented, decremented or remains unchanged. The output of the counter is provided as an input to a respective variable delayline circuit 112 or 114. In one implementation, the counter is implemented as a state machine that generates an eight-bit control signal for transmission to the variable delayline circuit. The counter is incremented whenever the "I'm Early" condition only is detected, decremented when the "I'm late" condition only is detected and remains unchanged if neither or both are detected. In one implementation, updates to the counter are dampened by a lower frequency clock signal (e.g., an 8 kHz clock signal) that is provided as an input to a clock input of the counter 304.

Referring again to FIG. 1b, frequency source A and B are of substantially identical frequency, but of arbitrary phase. In one implementation, both of frequency source A and B are set to substantially 19.44 MHz. Receiving devices (e.g. Multiplexors 140) select one of the frequency source signals as an output clock signal to be produced by system 50. When a given source (either frequency source A or B) is selected as the output clock, changes to the variable delayline circuit in the selected frequency source's path are disabled. In one implementation, each device (comparator circuit and variable delayline circuit) is disabled if its respective frequency source is the selected source. The active variable delayline circuit (either 112 and 114 in the slave frequency source signal path) provides a delayed version of the slave(non-selected) frequency source input signals. The signals are delayed so as to achieve phase alignment of the signals received by multiplexor 140. When the slave signal is selected using multiplexor 140, phase alignment is assured at the time of transition.

Variable delayline circuits 112 and 114 are configured to provide a variable delay to a respective frequency source signal. The delay is configured to allow for a phase difference between the two frequency source signals to exceed one clock period. Each variable delayline circuit 112 and 114 can include a controller 162 and 164, respectively. Controller 162 and 164 operate to adjust the delay line in single quantum steps. In one implementation, the total available variation in delay selected is 70 nanoseconds where a 19.44 MHz frequency source is used. The resulting period of the frequency source is approximately 50 nanoseconds. In this implementation, the 70-nanosecond delay is divided into 256 regular intervals where each step is approximately 0.25 nanoseconds. The size of the delay is selected based on the full range of the frequency source that is being switched. In another implementation, controller 162 and 164 are discrete components that are packaged with a respective comparator circuit 152 and 154, and are not part of the variable delay line circuit. In this configuration, controller 162 and 164 provide control signals to the variable delay line circuit to set the delay through the device.

In operation, at regular intervals, a comparator circuit (either 152 or 154) for the slave frequency source (the frequency source that is currently not selected) compares the phase of the two frequency sources at a position of equal delay from the sources. In one implementation, the comparison is made at the output of output circuits 132 and 134. A determination is made as to whether the slave frequency source requires no adjustment, a forward adjustment or a backward adjustment. The output of the comparator circuit is provided as an input to an associated variable delayline circuit controller that in turn steps either forward or backward one or more intervals of delay. If no adjustment is required, then the controller maintains the delay interval setting.

The adjustment interval was selected to allow for a sufficient adjustment rate to track the maximum clock differences possible between two distinct yet frequency locked sources. In one implementation, the absolute value of the difference was measured such that when the maximum or minimum delay point was reached, the delay would be adjusted exactly one clock period away from the limit. In one implementation, when the wrap around condition is reached, the counter in the comparator circuit (counter 304) is incremented or decremented by 206 counts to reposition the signal by one clock cycle. This repositioning reduces the time required to reach stability. By setting the total delay to be greater than one clock period, hysterysis is provided.

Output circuits 132 and 134 are used for starting or stopping the associated frequency source signal. When enabled, the output circuit provides as an output a frequency source signal (either unmodified or delayed depending upon the phase of the respective frequency sources) that is coupled to an input of a receiving device (e.g. multiplexors 140).

The variable delayline circuit can itself create runt clock pulses or glitches when the delay setting is adjusted. To remove these types of glitches, a phase-locked loop (122 and 124) is coupled to the output of each variable delayline circuit to clean up the resulting (delayed) clock signal produced by the respective variable delayline circuit.

In one implementation, a second clock source can be produced from each phase adjusted frequency source signal (signals output by PLL 122 and 124). For example, a lower frequency clock signal can be derived from each of the phase adjusted frequency source signals producing two lower frequency signals. The two lower frequency signals are of the same frequency (frequency locked) and of the same phase after the operation of the coarse adjustment circuit described below. A divider can be included in the system for dividing the frequency source signals (e.g., the 19.44 MHz frequency source signals) to a lower frequency signal (e.g., an 8 kHz signal). In one implementation, the divider circuit utilizes a counter for determining how to divide the input frequency source signal. The counter can be incremented/decremented after each rising/falling edge of the input signal is received. After a predefined number of edges are counted, the output of the divider circuit can be transitioned to a next state (hi or lo) producing the requisite lower frequency signal. The counter can be of the form of a variable loading count down counter.

In one implementation, the counter can be incremented or decremented at other times depending on the feedback provided from a coarse comparison circuit in each frequency source signal path. The course comparison circuit includes a phase detector. The phase detector samples both of the lower frequency clock signals (e.g., 8 kHz clock signals). In one implementation, the phase detector samples both the lower frequency signals on the opposite edge from where the counter changes. On a sample where the phase detector sees a falling edge on both its own 8 kHz local clock signal line and the second 8 kHz clock signal line, then the two 8 kHz clock signal lines are aligned to within the desired +/−½ clock period of accuracy. In all other cases, the phase detector will "jam" a new count in the count down counter and clear the output of the divider. In an 8 kHz implementation, the count down counter normally loads a count of 1214 counts (to produce a 8 kHz clock from a 19.44 MHz frequency source). When the counter reaches zero, the output of the divider is toggled as described above and the count is loaded again. When a "jam" operation is detected, the count down counter loads a lesser count (e.g., a count of 1213 counts) to compensate for the clock cycle lost in the phase detector.

When the new count is jammed, a status bit can be set which can also set an interrupt. In operation, only a single jam operation should be required. If more jam operations are required, then these additional occurrences may be an indication of clock instability and excessive phase movement. The coarse phase adjustment provides phase locking to within plus or minus one half clock cycle of the active (master) clock controller.

Figure 4:
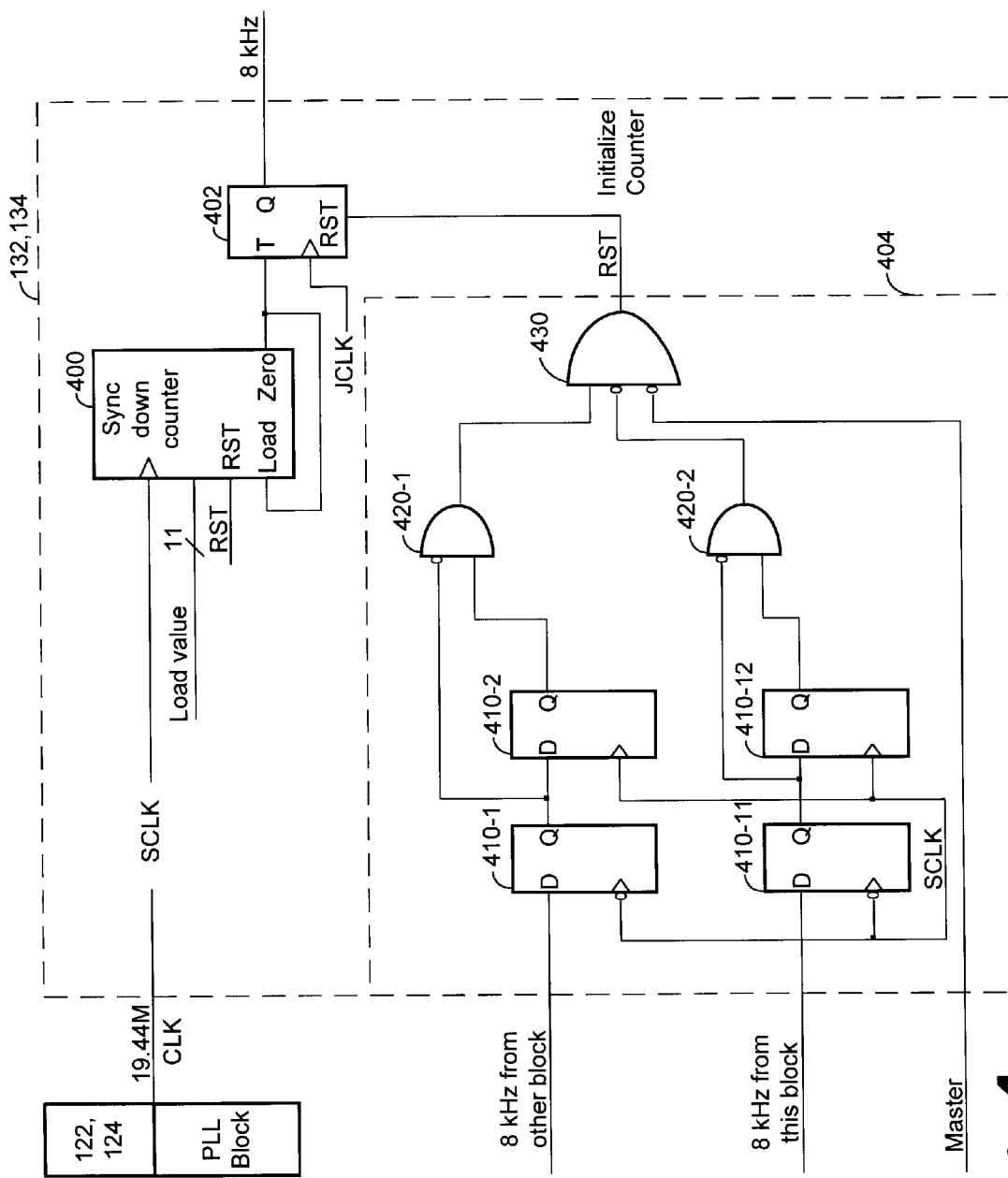
FIG. 4 is a schematic diagram of an output circuit that includes a coarse adjustment.

Referring now to FIG. 4, an output circuit 132 and 134 that includes a coarse adjustment for producing a lower frequency signal from the local frequency source signal is shown. The output of PLL 122 and 124 is provided as an input to output circuit 132 and 134. Output circuit 132 and 134 includes a down counter 400, a flip-flop 402 and phase comparator 404. The local frequency source signal (e.g. a 19.44 MHz frequency source signal from PLL 122 or 124) is coupled to a synchronization input of down counter 400. A load value is provided to an input of the down counter. The load value may vary depending on the operation of the phase detector 404. In one implementation, either a load value of 1214 or 1213 is provided to the down counter 400. The output of down counter 400 is coupled to an input of flip-flop 402 and to the reload input of the down counter. In this way, when the output of the down counter is set after reaching a count of zero, the down counter is reloaded with the appropriate load value.

The output of the flip-flop 402 is a phase adjusted lower frequency clock signal that can be provided to plural receiving devices (e.g. multiplexors 140). The clock input for the flip-flop 402 is coupled to the local frequency source signal (e.g., the same 19.44 MHz signal input provided to the synchronization input of the down counter 400). In one implementation, flip-flop 402 is a T Flip-flop.

Phase comparator 404 includes a plurality of D flip-flops 410 and logic gates 420 and 430. For a given comparator circuit, the local frequency source signal is provided as an input to a first D flip-flop 310-11. The first D flip-flop's 310-11 output is coupled to the input of a second D flip-flop 310-12 and to the inverted input of a first logic gate 420-2. The output of the second D flip-flop 310-12 is coupled to a non-inverting input of logic gate 420-2. The output of logic gate 420-2 is coupled to an inverting input of logic gate 430.

The second frequency source signal (the non-local signal) is provided as an input to a first D flip-flop 410-1. The first D flip-flop's 410-1 output is coupled to the input of a second D flip-flop 310-12 and to the inverting input of logic gate 420-1. The output of the second D flip-flop 310-12 is coupled to the non-inverting input of logic gate 420-1. The output of logic gate 420-1 is coupled to a non-inverting input of logic gate 430. The clock inputs for each of the first and second D flip-flops 410 are coupled to the local frequency source (Frequency source A for comparator output circuit 132 or Frequency source B for output circuit 134). For output circuit 132, the local frequency source input (input to D flip-flop 410-11) is local 8 kHz clock signal that is generated as an output from flip-flop 402. For output circuit 132, the frequency source input (input to D flip-flop 410-1) is the second 8 kHz clock signal that is generated as an output from the other output circuit's flip-flop 402. Those of ordinary skill in the art will recognize that the cascading of D flip-flops provides a metastable solution for the phase comparison operation.

The output of logic gate 430 is coupled to the reset input of both the down counter 400 and flip-flop 402. Depending on the state of the local and the second frequency source signal, down counter 400 is reset to initialize the counter. In one implementation, if the reset signal line is set to zero, then the load value loaded into the down counter 400 is set to 1214 counts. If the reset value is set to one, then the load value loaded into the down counter 400 is set to 1213 counts. In one implementation, logic gate 430 includes a master input for triggering a master reset of the down counter. In the general case, the load value (count) is adjusted up or down by one count from a nominal value. This operation will produce a gradual phase movement of the lower frequency clock source, in steps of one period of the higher frequency clock source. In one implementation, the lower frequency clock source is brought into immediate alignment by jamming the divider (e.g. the down counter) to the appropriate state.

A number of implementations of the invention have been described. Nevertheless, it will be understood that various modifications may be made without departing from the spirit and scope of the invention. Accordingly, other embodiments are within the scope of the following claims.

What is claimed is:

1. A redundant clock controller comprising:

a first input operable to receive a first clock signal having a first frequency;

a first output operable to couple the first clock signal to a receiving device;

a second input operable to receive a second clock having a same frequency as the first clock signal but of arbitrary phase;

a second output;

a variable delay line coupling the second clock signal to the second output, the second output operable to couple a delayed version of the second clock signal to the receiving device; and a comparator receiving as an input the first and the second clock signals and providing as an output to the variable delay line a control signal for adjusting a delay in the second clock signal so as to match a phase of the first clock signal received at the receiving device.

2. The redundant clock controller of claim 1 wherein the variable delay line includes a delay that can be adjusted to be greater than a period of the first clock signal.

3. The redundant clock controller of claim 2 wherein the first clock frequency is set to approximately 19.44 MHz and where the delay can be adjusted up to 70 nanoseconds.

4. The redundant clock controller of claim 1 further comprising a first output circuit coupling the first clock signal to the first output, and a second output circuit coupling the delayed version of the second clock signal to the second output, wherein each of the output circuits includes means for disabling the transmission of a respective clock signal to the receiving device.

5. The redundant clock controller of claim 4 wherein the output circuit includes a divider circuit for producing a lower frequency clock signal from a respective clock signal.

6. The redundant clock controller of claim 5 wherein the first clock frequency signal is approximately 19.44 MHz and the lower clock frequency signal is approximately 8 kHz.

7. The redundant clock controller of claim 5 wherein the divider includes a down counter operable to receive a Clock signal of a high frequency and output a signal of a lower frequency, wherein the lower frequency level is determined by a count value that is loaded into the down counter after each reset.

8. The redundant clock controller of claim 7 further comprising a coarse alignment circuit operable to monitor the phase difference between the two low frequency clock signals generated by the respective output circuits wherein the count value is varied depending on the phase difference between the two low frequency clock signals.

9. The redundant clock controller of claim 5 wherein the first clock frequency signal is approximately 19.44 MHz, the lower clock frequency signal is approximately 8 kHz and the count value is varied between 1213 and 1214 counts.

10. The redundant clock controller of claim 1 further comprising a first phase locked loop coupled between the variable delay line and the second output operable to low pass filter glitches introduced by the variable delay line circuit.

11. The redundant clock controller of claim 1 further comprising
    a second variable delay line coupled between the first input and the first output;
    a second comparator receiving as an input the first and the second clock signals and providing as an output to the second variable delay line a second control signal for adjusting a delay in the first clock signal so as to match a phase of the second clock signal received at the receiving device;
    a selector for selecting one of either the first or the second clock signals as a master clock signal; and
    means for disabling the delay imparted from the variable delay line in the signal path for the master clock signal.

12. The redundant clock controller of claim 11 further including a phase locked loop in line between each variable line delay and a respective output, the phased locked loop operable to provide a low pass filter for glitches introduced by a variable delay line to a respective clock signal.

13. The redundant clock controller of claim 1 wherein the comparator further comprises a counter, a phase comparator and a controller, the phase comparator receiving as inputs each of the first and second clock signal and providing as an output an indication of a relative phase difference between the two clock signals, the output of the phase comparator being coupled to the input of the counter, the counter operable to evaluate the indication received from the phase comparator and provide as an output a count that reflects a change in the delay provided by the variable delay line so as to minimize the phase difference between the first and second clock signals, the output of the counter coupled to the input of controller, the controller operable to program the variable delay line to set the delay for the second clock signal.

14. A method for providing a redundant clock signal to a receiving device comprising:
    providing first and second frequency source signals, each of the first and second frequency source signal being of a same frequency but of arbitrary phase;
    comparing the first and second frequency source signals to determine a phase difference between the first and second frequency source signals;
    selecting one of the first and second frequency source signals as a master clock signal, the other being a slave clock signal;
    if a phase difference is detected, setting a delay in the slave clock signal so as to align the phase of the slave clock signal to the master clock signal;
    providing the master clock signal to a receiving device; and
    switching upon a predetermined event and providing the slave clock signal to the receiving device without introducing glitches in the switchover.

15. A clock controller comprising:
    a first input operable to receive a first clock signal having a first frequency;
    a second input operable to receive a second clock having a same frequency as the first clock signal but of arbitrary phase;
    a first output;
    a variable delay line coupling the first clock signal received at the first input to the first output, the first output operable to couple a delayed version of the first clock signal to a receiving device; and
    a comparator receiving as an input the first and the second clock signals from the first and second inputs and providing as an output to the variable delay line a control signal for adjusting a delay in the first clock signal so as to match a phase of the second clock signal received at the receiving device.

16. The clock controller of claim 15 wherein the variable delay line includes a delay that can be adjusted to be greater than a period of the first clock signal.

17. The clock controller of claim 16 wherein the first clock frequency is set to approximately 19.44 MHz and where the delay can be adjusted up to 70 nanoseconds.

18. The clock controller of claim 15 further comprising a first output circuit coupling the delayed first clock signal output from the variable delay line to the first output, the output circuit including means for disabling the transmission of the first clock signal to the receiving device.

19. The clock controller of claim 18 wherein the output circuit includes a divider circuit for producing a lower frequency clock signal from the first clock signal.

20. The clock controller of claim 19 wherein the first clock frequency signal is approximately 19.44 MHz and the lower clock frequency signal is approximately 8 kHz.

21. The clock controller of claim 19 wherein the divider includes a down counter operable to receive a clock signal of a high frequency and output a signal of a lower frequency, wherein the lower frequency level is determined by a count value that is loaded into the down counter after each reset.

22. The clock controller of claim 18 further comprising a coarse alignment circuit operable to monitor the phase difference between two low frequency clock signals generated by respective output circuits of two clock controllers wherein the count value is varied depending on the phase difference between the two low frequency clock signals.

23. The redundant clock controller of claim 22 wherein the first clock frequency signal is approximately 19.44 MHz, the lower clock frequency signal is approximately 8 kHz and the count value is varied between 1213 and 1214 counts.

24. The redundant clock controller of claim 15 further comprising a first phase locked loop coupled between the variable delay line and the first output operable to low pass filter glitches introduced by the variable delay line circuit.

25. The redundant clock controller of claim 15 further comprising a selector for selecting the clock controller from a group of clock controllers as a master clock controller; and means for disabling the delay imparted from the variable delay line in the signal path for the master clock controller.

26. The redundant clock controller of claim 15 wherein the comparator further comprises a counter, a phase comparator and a controller, the phase comparator receiving as inputs each of the first and second clock signal and providing as an output an indication of a relative phase difference between the two clock signals, the output of the phase comparator being coupled to the input of the counter, the counter operable to evaluate the indication received from the phase comparator and provide as an output a count that reflects a change in the delay provided by the variable delay line so as to minimize the phase difference between the first and second clock signals, the output of the counter coupled to the input of controller, the controller operable to program the variable delay line to set the delay for the first clock signal.

27. A clock controller, comprising:

a variable delay line circuit configured to vary an amount of delay of a first clock signal based on a control signal to produce a delayed signal;

a phase locked loop circuit connected to an output of the variable delay line circuit and configured to remove glitches in the delayed signal;

a comparator configured to compare the delayed signal and a second clock signal to generate a comparison signal; and a controller configured to generate the control signal for the variable delay line circuit based on the comparison signal.

28. The clock controller of claim 27, further comprising:

a second variable delay line circuit configured to vary an amount of delay of the second clock signal based on a second control signal to produce a second delayed signal;

a second phase locked loop circuit connected to the second variable delay line circuit and configured to remove glitches in the second delayed signal; and a second controller configured to generate the second control signal for the second variable delay line circuit based on a second comparison signal.

29. The clock controller of claim 28, further comprising:

a second comparator configured to compare the second delayed signal and the first clock signal to generate the second comparison signal.

* * * * *